US010738951B2

(12) United States Patent  (10) Patent No.: US 10,738,951 B2
Zhang et al.  (45) Date of Patent: Aug. 11, 2020

(54) LED LIGHT WITH LIGHT FILTER DEVICE

(71) Applicant: GE Lighting Solutions, LLC, East Cleveland, OH (US)

(72) Inventors: Wenjiang Zhang, Shanghai (CN); Ruojian Zhu, Shanghai (CN)

(73) Assignee: Consumer Lighting (U.S.), LLC, Norwalk, CT (US)

( * ) Notice: Subject to any disclaimer, the term of this patent is extended or adjusted under 35 U.S.C. 154(b) by 0 days.

(21) Appl. No.: 16/295,359

(22) Filed: Mar. 7, 2019

(65) Prior Publication Data

US 2019/0277456 A1  Sep. 12, 2019

(30) Foreign Application Priority Data

Mar. 12, 2018  (CN) .......................... 2018 1 0200947

(51) Int. Cl.
| | |
|---|---|
| *F21K 9/69* | (2016.01) |
| *C03C 3/04* | (2006.01) |
| *C03C 4/08* | (2006.01) |
| *F21K 9/233* | (2016.01) |
| *F21V 5/04* | (2006.01) |
| *F21Y 115/10* | (2016.01) |

(52) U.S. Cl.
CPC .................. *F21K 9/69* (2016.08); *C03C 3/04* (2013.01); *C03C 4/08* (2013.01); *F21K 9/233* (2016.08); *F21V 5/04* (2013.01); *F21Y 2115/10* (2016.08)

(58) Field of Classification Search
CPC ... F21K 9/69; F21K 9/233; F21K 5/04; C03C 3/04; C03C 4/08
See application file for complete search history.

(56) References Cited

U.S. PATENT DOCUMENTS

| | | |
|---|---|---|
| 4,315,186 A | 2/1982 | Hirano et al. |
| 6,358,873 B1 | 3/2002 | Stewart |
| D586,501 S | 2/2009 | Mayer et al. |
| 8,757,840 B2 | 6/2014 | Pickard et al. |
| 8,888,332 B2 | 11/2014 | Martis et al. |
| 9,022,601 B2 | 5/2015 | Lu et al. |
| D794,837 S | 8/2017 | Rintamaki et al. |
| 2013/0114266 A1 | 5/2013 | Chuang et al. |

(Continued)

FOREIGN PATENT DOCUMENTS

| | | |
|---|---|---|
| CN | 102401326 A | 4/2012 |
| CN | 203744055 U | 7/2014 |

(Continued)

OTHER PUBLICATIONS

Chinese First Office Action received for Chinese Patent Application 201810200947.5 dated Mar. 24, 2020, 14 pages (8 pages Official Copy + 6 pages English Translation).

*Primary Examiner* — Joseph L Williams
(74) *Attorney, Agent, or Firm* — Wood IP Law

(57) ABSTRACT

The present invention provides a lamp that includes: an LED light source; a lens having an incident surface and an emergent surface, the incident surface defining a first cavity, and the emergent surface having an annular protuberance thereon; and a light filter device accommodated within a space defined by the annular protuberance of the lens, wherein, the LED light source is situated within or proximate to the first cavity, to enable light emitted from the LED light source entering the lens from the incident surface and exiting the lens from the emergent surface to be at least partially transmitted through the light filter device.

10 Claims, 6 Drawing Sheets

(56) References Cited

U.S. PATENT DOCUMENTS

| | | |
|---|---|---|
| 2017/0130935 A1 | 5/2017 | Hong |
| 2019/0093833 A1 | 3/2019 | Zhang |

FOREIGN PATENT DOCUMENTS

| | | |
|---|---|---|
| CN | 205480483 U | 8/2016 |
| CN | 206470476 U | 9/2017 |
| CN | 206608822 U | 11/2017 |
| CN | 107504453 A | 12/2017 |

| | $Nd_2O_3$ content (wt%) | Lumen output (lm) | Lumen loss | CRI | CRI increase | R9 | R9 increase |
|---|---|---|---|---|---|---|---|
| Comparative example | 0 | 577.4 | | 81.5 | | 2.14 | |
| Example 1 | 2% | 455.9 | 21.0% | 94.8 | +13.3% | 65.03 | +62.89% |
| Example 2 | 5% | 417.4 | 27.7% | 93.8 | +12.3% | 88.58 | +86.44% |

FIG. 6

LED LIGHT WITH LIGHT FILTER DEVICE

TECHNICAL FIELD

The present application is applicable to the field of illumination, and more particularly to an LED lamp having a light filter device.

BACKGROUND

Compared with ordinary light sources, Light Emitting Diode (LED) light sources are highly efficient, environmentally friendly and have a long service life, therefore they are becoming the primary choice for reducing the energy consumption of indoor and external lighting.

Although LED lighting technology has obvious advantages in energy saving and efficient lighting, at the same time, the color rendering of the LED light source is poor, and it is unable to restore the true color of the illuminated object. In previous attempts, the color rendering of LEDs can be improved by the doping of light filter material particles into the lens of the LED. However, the doping of light filter material particles into the lens results in an increase in light absorptivity, a decrease in luminous efficiency, while the price of light filter material particles is also quite high, which may result in an increase in the manufacturing cost of the LED.

Therefore, it is necessary to provide a new LED lamp with a light filter device to solve at least one of the above problems.

SUMMARY

The present invention provides a lamp comprising: an LED light source; a lens comprising an incident surface and an emergent surface, the incident surface defining a first cavity, and the emergent surface comprising an annular protuberance thereon; and a light filter device accommodated within a space defined by the annular protuberance of the lens, wherein, the LED light source is situated within or proximate to the first cavity, to enable light emitted from the LED light source entering the lens from the incident surface and exiting the lens from the emergent surface to be at least partially transmitted through the light filter device.

The purpose of the present application is to provide a new LED lamp with a light filter device, which allows the light filter device to be mounted onto the lens of the LED lamp through a simple physical connection, thereby improving the color rendering of the LED.

BRIEF DESCRIPTION OF DRAWINGS

Embodiments of the present application are described with reference to the accompanying drawings, so that the present invention can be better understood. In the accompanying drawings:

FIG. 6 is a graph showing measurement results for evaluating luminous efficiency and color rendering index of an LED lamp.

DETAILED DESCRIPTION OF EMBODIMENTS

Figure 1:
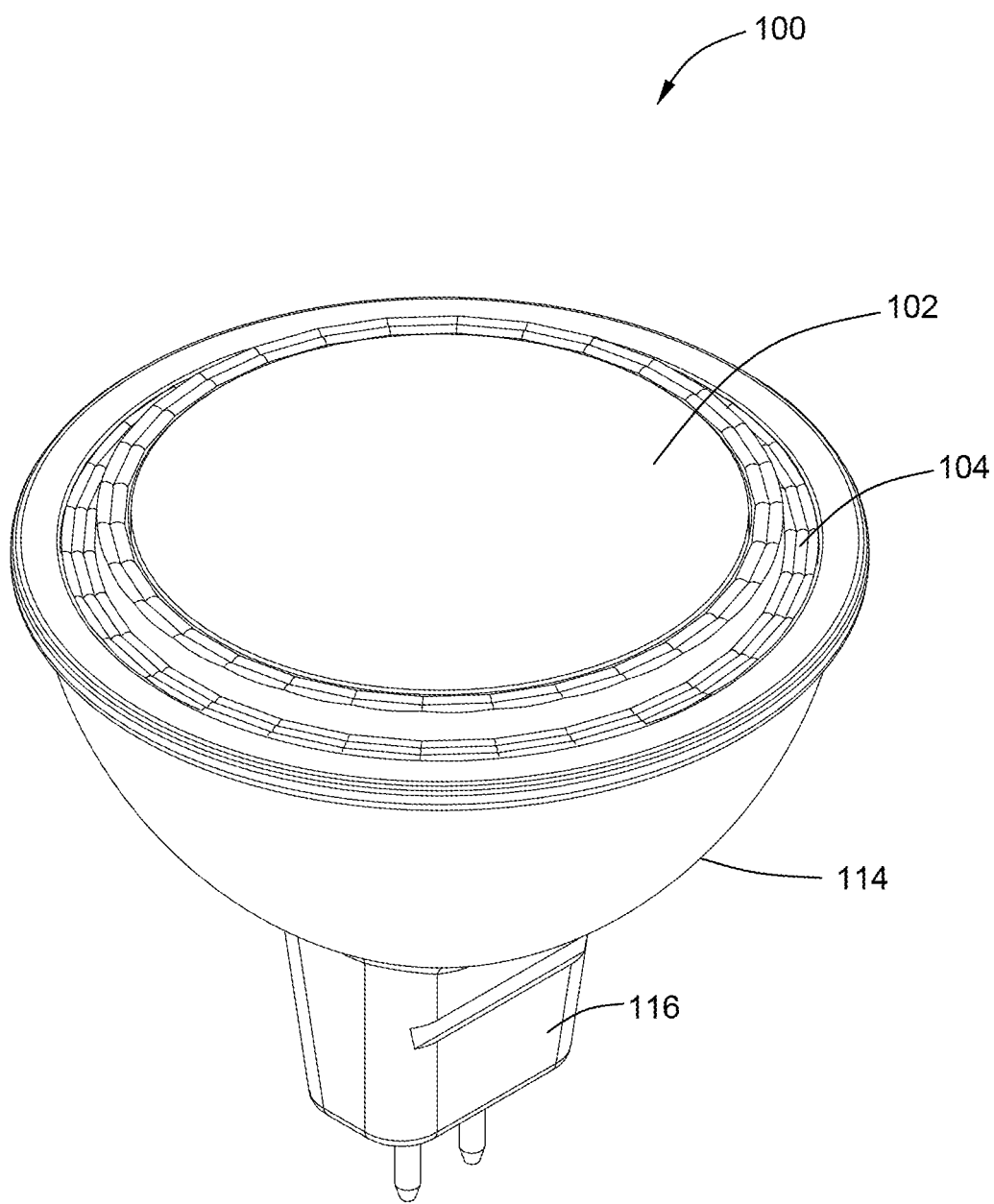
FIG. 1 is a perspective view of an LED lamp according to an embodiment of the present invention.

The embodiments of the present invention will be described below in detail with reference to the accompanying drawings in order to facilitate those skilled in the art to exactly understand the subject matter claimed by the present invention. In the following detailed description of these specific embodiments, the present specification does not describe in detail any of the known functions or configurations, to avoid unnecessary details that may affect the disclosure of the present invention.

Unless otherwise defined, the technical and scientific terms used in the claims and the specification are as they are usually understood by those skilled in the art to which the present invention pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, but may also include electrical connections, whether direct or indirect. In addition, terms indicating a specific position, such as "top", "bottom", "upper", "lower", "front", and "back", etc., are merely descriptions made with reference to the specific drawings. Each embodiment disclosed herein may be placed in different ways as illustrated in the drawings of the present invention. Therefore, the positional terms used herein should not be limited to the positions shown in the specific embodiments.

Figure 2:
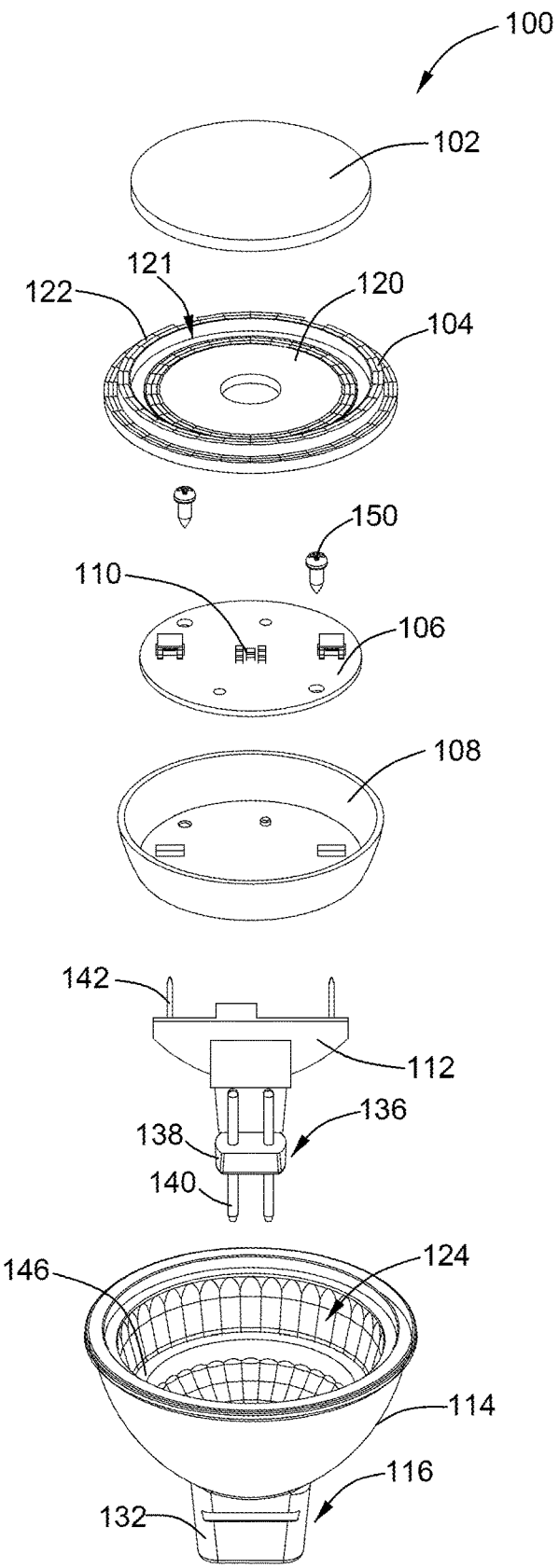
FIG. 2 is an exploded view of the LED lamp shown in FIG. 1.
Figure 3:
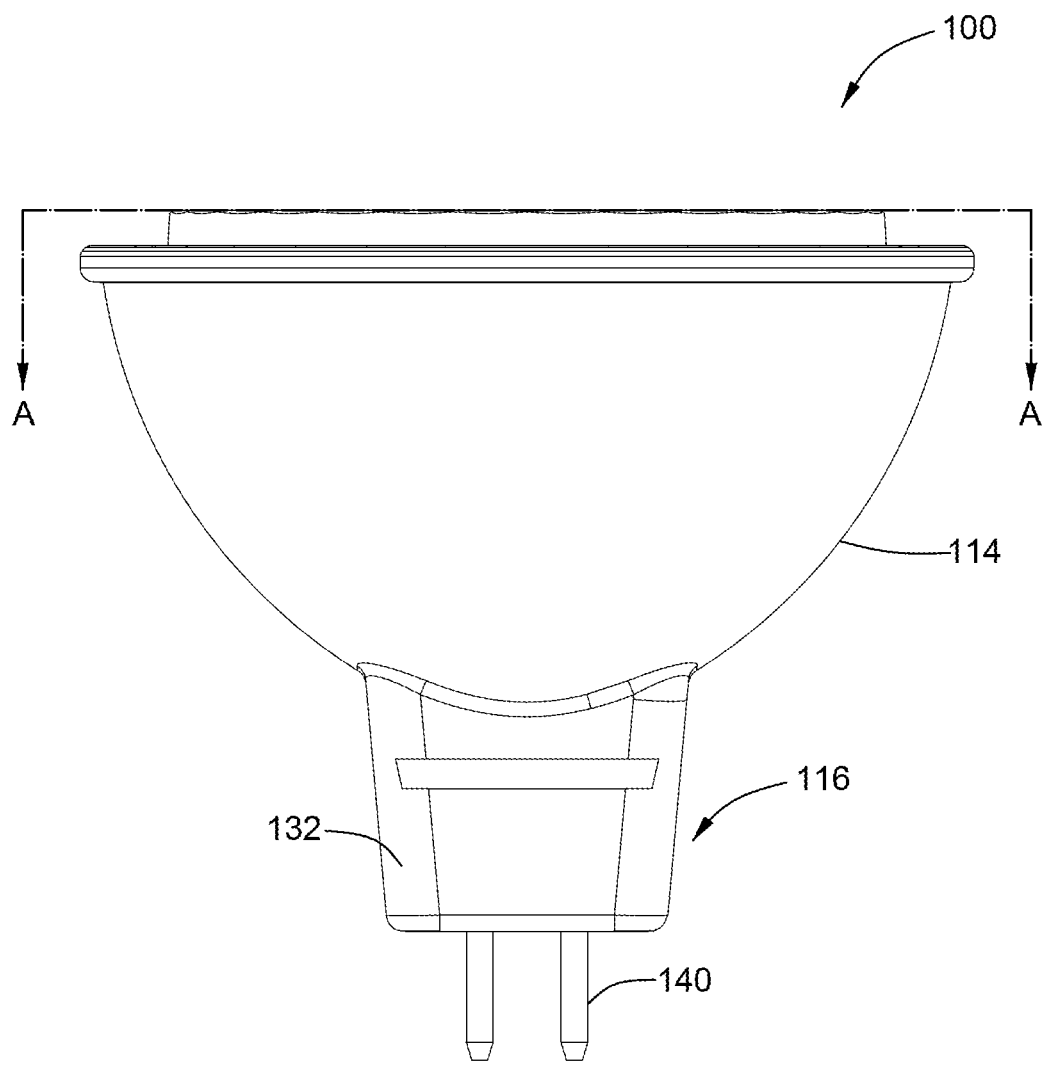
FIG. 3 is a front view of the LED lamp shown in FIG. 1.
Figure 4:
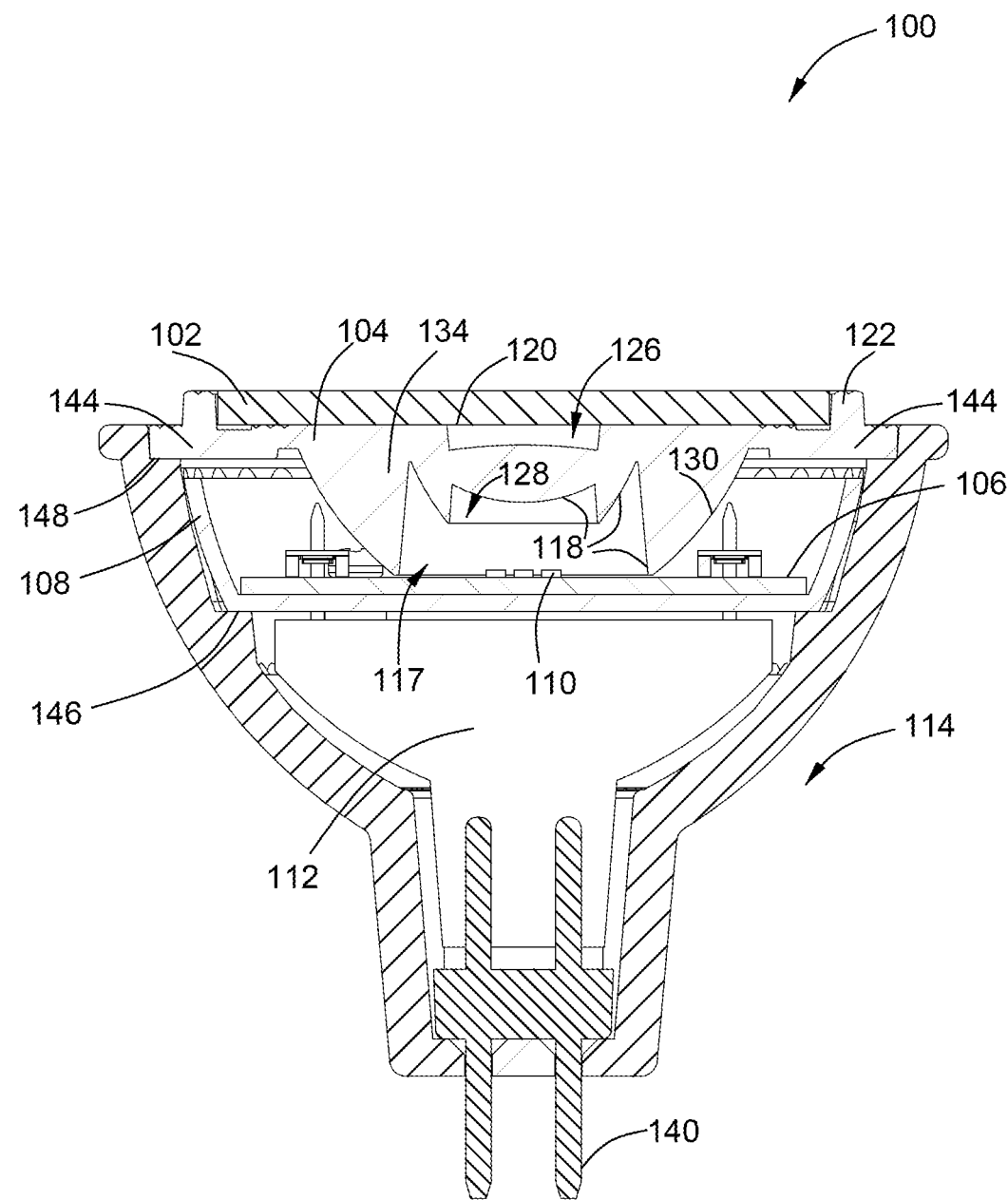
FIG. 4 is a cross-sectional view of the LED lamp of FIG. 3 taken along line A-A.

FIG. 1 is a perspective view of an LED lamp according to an embodiment of the present invention. FIG. 2 is an exploded diagram of the LED lamp 100 shown in FIG. 1. FIG. 3 is a front view of the LED lamp shown in FIG. 1. FIG. 4 is a cross-sectional view of the LED lamp of FIG. 3 taken along line A-A.

As shown in FIGS. 1-4, the LED lamp 100 comprises a light filter device 102, a lens 104, a light source panel 106, an LED light source 110, a driving module 112, and a shell 114. The lens 104 comprises an incident surface 118 and an emergent surface 120, the emergent surface 120 comprising an annular protuberance 122 protruding from the emergent surface 120, the annular protuberance 122 forming a space, and in some embodiments, the space is a circular groove 121. The LED light source 110 is located in the first cavity 117 within the lens 104 such that the lens 104 can cover the LED light source 110, and in other embodiments, the LED light source 110 is proximate to the first cavity 117. The LED light source 110 may have one or more LED chips, wherein the number of LED chips depends on actual needs, such as the lumens of the light. The light filter device 102 is housed within the space formed by the annular protuberance 122, that is, received in the groove 121, such that light emitted from the LED light source 110 is incident from the incident surface 118 of the lens 104 and is emitted from the emergent surface 120 of the lens 104, wherein at least part of it is emitted through the light filter device 102. The shell 114 is used to secure the lens 104 and form a second inner cavity 124 with the lens 104. The light source panel 106 and the driving module 112 are located in the second inner cavity 124, the light source panel 106 is used to mount the LED light source 110, the driving module 112 is coupled to the LED light source 110 and the light source panel 106 for providing power and adjusting the current supplied to the LED light source 110. In some embodiments, the driving module 112 comprises a pair of pins 142, the light source panel 106 provides a pair of terminals for coupling a pair of pins 142 on the driving module 112, in order to realize the electrical connection between the LED light source 110 and the driving module 112 on the light source panel 106. In some embodiments, the pins 142 can be replaced with a wire, one end of the wire is coupled to the driving module 112, and the other end is soldered to the LED light source 110 through one or more holes provided by the light source plate 106, to realize the electrical connection between the LED light source 110 and the driving modules 112.

As shown in FIGS. 2 and 3, the shell 114 comprises a base 116 for connecting to an external power source. In some embodiments, the shell 114 is primarily made out of glass. The base 116 is shown as a plug-in base that comprises a cover structure 132 and a pin module 136 (not all shown in FIG. 3) mounted within the cover structure 132 and proximate to the bottom end of the cover structure 132. The pin module 136 comprises an insulating support panel 138 and a pin 140, the bottom end of the pin 140 protrudes from the bottom end of the cover structure 132 for connecting with an external power source, and the top end of the pin 140 is electrically connected to the driving module 112. In other embodiments, the LED lamp 100 may comprise other types of bases, such as a threaded mount or a bayonet mount.

With continued reference to FIGS. 2 and 4, the LED lamp 100 further comprises a support member 108 located within the second cavity 124, coupled between the light source panel 106 and the driving module 112. The support member 108 is for supporting the light source panel 106, and the light source panel 106 is secured to the support member 108 by at least one fixing member, such as a screw 150. In some embodiments, the inner wall of the shell 114 has a first boss 146 for positioning the support member 108.

In the embodiment shown in FIG. 4, the LED lamp 100 may be a reflector type LED lamp. The lens 104 is made of a transparent material, and in a non-limiting embodiment, the material of the lens is selected from the group consisting of glass, resin, and combinations thereof, wherein the resin may be an acrylic resin, a methacrylic resin, or a polycarbonate. The lens 104 comprises a lens body 134 and a mounting portion 144 that surrounds the lens body 134. The lens body 134 is substantially bowl-shaped, and provides the incident surface 118, the emergent surface 120, the reflective surface 130 and the first cavity 117; wherein, the incident surface 118 is substantially at the bottom of the lens body 134 of the bowl-shaped structure, and the emergent surface 120 is located substantially in the plane of the mouth of the bowl-shaped structure of the lens body 134, the reflecting surface 130 is located substantially on the side wall of the bowl-like structure of the lens body 134. The bowl-shaped lens body 134 is further provided with an upper groove 126 and a lower groove 128. Wherein, the reflective surface 130 is capable of total internal reflection (TIR), and combines the upper groove 126 and the lower groove 128 such that the light incident from the LED light source 110 from the incident surface 118 can achieve a concentrating effect. The annular protuberance 122 is formed on the mounting portion 144 of the lens 104 for mounting the light filter device 102; the thickness of the light filter device 102 is 2 to 2.5 mm, and the height of the annular protuberance 122 is slightly higher than that of the light filter device 102. In some embodiments, the light filter device 102 is a circular filter; in order for the light emitted from the lens 104 to pass through the light filter device 102 as much as possible, the filter and the lens 104 are concentric, and the radius of the filter is 60% to 90% of the radius of the emergent surface 120 of the lens 104.

Figure 5:
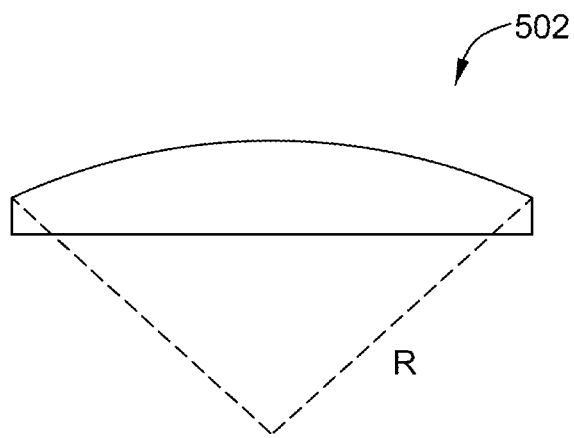
FIG. 5 is a front view of another embodiment of a light filter device suitable for use in the LED lamp of FIG. 1.

In some embodiments, as shown in FIG. 5, one side of the light filter device 502 is a flat surface, and another side is an upwardly convex curved surface, which comprises a spherical cap structure and a cylindrical structure, wherein the radius R of the spherical cap structure is less than or equal to 84 mm, while the height of the cylindrical structure is about 2 mm. The spherical cap structure is a part of a sphere that is cut off by a plane, while the cut circular surface is the bottom, and the portion perpendicular to the diameter of the circular surface is the height. In other embodiments, the shape of the light filter device can be adjusted based on the configuration of the lens and the application of the LED.

As shown in FIG. 4, the inner wall of the shell 114 has a second boss 148 for positioning the lens 104. In some embodiments, at least a portion of the mounting portion 144 of the lens 104 is secured to the second boss 148 by a transparent adhesive. In some embodiments, the corresponding emergent surface of the mounting portion 144 of the lens 104 may have a plurality of microstructures, and the plurality of microstructures may be injection molded with the lens 104; the plurality of microstructures may be a plurality of micro-protrusions or a plurality of protruding annular stripes.

In the embodiment shown in FIG. 4, the light filter device 102 is secured in the space formed by the annular protuberances 122 using a transparent adhesive. In a non-limiting embodiment, the transparent adhesive is selected from the group consisting of silicone adhesives, epoxy adhesives, polyurethane adhesives, phenolic adhesives, and combinations thereof. In other embodiments, the light filter device 102 is secured in the space formed by the annular protuberances 122 by at least one of a clasp connection, a thread connection, a screw connection and interference connection. In some embodiments, the light filter device 102 and the lens 104 are integrally formed separately, and are positioned by the annular protuberance 122, and then assembled together using an adhesive or a mechanical structure, which is convenient and quick, and is not easy to fall off.

In some embodiments, the light filter device comprises a substrate and a light filter material, the light filter material being doped in the substrate. Wherein, the substrate is a transparent glass substrate or a transparent resin substrate, and the light filter material is selected from materials capable of absorbing light having a wavelength in the region of 575 nm to 600 nm, including but not limited to rare earth oxides. In some embodiments, the light filter material is a compound consisting a lanthanum element, such as antimony trioxide ($Nd_2O_3$), for increasing the radiant intensity of red light in the spectral band of the output light, and improving the color rendering of the LED. In some embodiments, the color of the light filter device varies depending on the amount of the cerium-containing compound added, which is a transparent blue color when the content is low, and a transparent purple color when the content is high.

In some embodiments, the light filter device is a transparent glass plate whose substrate is glass and the light filter material is $Nd_2O_3$. The light filter device is prepared by adding particles containing $Nd_2O_3$ during the preparation of a conventional glass plate.

FIG. 6 is a graph showing measurement results for evaluating luminous efficiency and color rendering index of an LED lamp, wherein the thickness of the filter device is 2 mm Among them, Embodiments 1 and 2 are lumen output and color rendering indexes in the case where 2% and 5% of $Nd_2O_3$ were added to the light filter device, respectively. In the comparative example, an LED lamp not using a light filter device was used, which can be used as a criterion for evaluating how much are the lumen output loss and the color rendering index change when consisting the light filter material.

As can be seen from FIG. 6, the higher the content of $Nd_2O_3$ within the light filter device, the higher the lumen output loss, the higher the color rendering index, and the higher the color rendering evaluation number R9. That is, the light filter device consisting the light filter material can improve the color rendering index of the LED lamp. In some embodiments, in order to reduce the lumen output loss, the addition mass of $Nd_2O_3$ in the filter device is 2% to 5% of the total mass of the light filter device.

As can be seen from the above embodiments, the present application combines a light filter device comprising a light filter material with a lens to increase the radiant intensity of red light in the spectral band of the LED output light and improve the color rendering of the LED. Moreover, the light filter device is embedded into the groove formed on the emergent surface of the lens, the installation is simple and quick, thereby improving work efficiency.

While the present invention has been described in connection with the specific embodiments, it will be understood by those skilled in the art that many modifications and variations can be made in the present application. It is, therefore, to be understood that the appended claims are intended to cover all such modifications and variations insofar as they are within the concept and scope of the invention.

The invention claimed is:

1. A LED lamp, comprising:
   a LED light source;
   a lens comprising an incident surface and an emergent surface, the incident surface defining a first cavity, and the emergent surface comprising an annular protuberance thereon; and
   a light filter device accommodated within a space defined by the annular protuberance of the lens,
   wherein, the LED light source is situated within or proximate to the first cavity, to enable light emitted from the LED light source entering the lens from the incident surface and exiting the lens from the emergent surface to be at least partially transmitted through the light filter device.

2. The LED lamp according to claim 1, wherein the light filter device comprises a substrate and a light filter material distributed in the substrate, and the substrate is one of a transparent glass substrate and a transparent resin substrate.

3. The LED lamp according to claim 2, wherein the light filter material comprises a compound containing neodymium, and the light filter device comprises 2~5 weight percent of said compound containing neodymium.

4. The LED lamp according to claim 3, wherein the light filter material comprises neodymium oxide.

5. The LED lamp according to claim 1, wherein the lens is made of a material selected from glass, resin and combinations thereof.

6. The LED lamp according to claim 1, wherein the light filter device is a circular light filter plate, and a radius of the circle light filter plate is between about 60 to 90% of a radius of the emergent surface.

7. The LED lamp according to claim 1, wherein the light filter device comprises a spherical cap structure having a radius less than and equal to 84 millimeters.

8. The LED lamp according to claim 1, wherein the light filter device is fixed to the space by a transparent adhesive, the transparent adhesive is selected from silica gel adhesives, epoxy resin adhesives, polyurethane adhesives, phenolic resin adhesives and combinations thereof.

9. The LED lamp according to claim 1, wherein the light filter device is fixed to the space by at least one of a clasp connection, a thread connection, a screw connection and interference connection.

10. The LED lamp according to claim 1, further comprising:
   a shell configured to fix the lens and form a second cavity with the lens, the shell comprising a base configured to be coupled to an external power supply;
   a printed circuit board situated in the second cavity, and configured to mount the LED light source; and
   a driving module coupled to the LED light source and the printed circuit board, the driving module situated in the second cavity and configured to adjust a current supplied to the LED light source.

* * * * *